US012771488B2

(12) United States Patent
Lei

(10) Patent No.: US 12,771,488 B2
(45) Date of Patent: Oct. 20, 2026

(54) METHOD AND APPARATUS FOR ERROR CASE HANDLING DURING MULTICAST HARQ RETRANSMISSION

(71) Applicant: Lenovo (Beijing) Limited, Beijing (CN)

(72) Inventor: Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 318 days.

(21) Appl. No.: 18/294,080

(22) PCT Filed: Aug. 18, 2021

(86) PCT No.: PCT/CN2021/113282
§ 371 (c)(1),
(2) Date: Jan. 31, 2024

(87) PCT Pub. No.: WO2023/019473
PCT Pub. Date: Feb. 23, 2023

(65) Prior Publication Data

US 2024/0340117 A1 Oct. 10, 2024

(51) Int. Cl.
*H04L 1/1829* (2023.01)
*H04L 12/18* (2006.01)
*H04W 4/06* (2009.01)

(52) U.S. Cl.
CPC ........ *H04L 1/1864* (2013.01); *H04L 12/1868* (2013.01); *H04W 4/06* (2013.01)

(58) Field of Classification Search
CPC . H04L 1/1864; H04L 12/1868; H04L 1/1822; H04W 4/06

(Continued)

(56) References Cited

U.S. PATENT DOCUMENTS

2021/0028890 A1 1/2021 Rico Alvarino et al.
2023/0049784 A1* 2/2023 Lee ........................ H04W 72/23
2024/0187824 A1* 6/2024 Wu .......................... H04W 4/06

FOREIGN PATENT DOCUMENTS

CN 101883325 A 11/2010
KR 20220104544 A * 7/2022 ............. H04L 1/003

OTHER PUBLICATIONS

Ericsson , "Reliability for multicast operation", 3GPP TSG-RAN WG2 #112e, Tdoc R2-2009961, Electronic meeting, Nov. 2, 2020, 4 pages.

(Continued)

*Primary Examiner* — Rownak Islam
(74) *Attorney, Agent, or Firm* — FIG. 1 Patents

(57) ABSTRACT

Embodiments of the present disclosure relate to HARQ retransmission for a multicast service. According to some embodiments of the disclosure, a method performed by a UE may include: receiving, from a BS, a first DCI for scheduling a first transmission using a HARQ process number, wherein a CRC of the first DCI is scrambled by a first RNTI; receiving, from the BS, a third DCI for scheduling a third transmission using the HARQ process number, wherein a CRC of the third DCI is scrambled by a third RNTI specific to the UE; and determining whether the third transmission is a retransmission of the first transmission or a retransmission of a second transmission scheduled by a second DCI, wherein the second DCI schedules the second transmission using the HARQ process number, a CRC of the second DCI is scrambled by a second RNTI common to a group of UEs including the UE.

20 Claims, 4 Drawing Sheets

(58) Field of Classification Search
USPC .......................................................... 370/329
See application file for complete search history.

(56) References Cited

OTHER PUBLICATIONS

Mediatek Inc. , "UE Reception Model of MBS Radio Bearer and its Dynamic PTM/PTP switch", 3GPP TSG-RAN WG2 Meeting #111 electronic, R2-2006575,Online [retrieved Mar. 15, 2023]. Retrieved from the Internet <https://www.3gpp.org/ftp/tsg_ran/WG2_RL2/TSGR2_111-e/Docs>., Aug. 2020, 15 Pages.
PCT/CN2021/113282 , "International Search Report and Written Opinion", PCT Application No. PCT/CN2021/113282, 6 pages.

* cited by examiner

METHOD AND APPARATUS FOR ERROR CASE HANDLING DURING MULTICAST HARQ RETRANSMISSION

TECHNICAL FIELD

Embodiments of the present disclosure generally relate to wireless communication technology, and more particularly to hybrid automatic repeat request (HARQ) retransmission for a multicast service.

BACKGROUND

Wireless communication systems are widely deployed to provide various telecommunication services, such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems, such as long term evolution (LTE) systems, LTE-advanced (LTE-A) systems, or LTE-A Pro systems, and fifth generation (5G) systems which may also be referred to as new radio (NR) systems.

A wireless communication system may support multicast and broadcast services (MBSs). One or more user equipment (UE) may be grouped as an MBS group and may receive multicast transmissions from a base station (BS) via a physical downlink shared channel (PDSCH). The multicast transmissions may be scheduled by downlink control information (DCI). The one or more UEs may transmit hybrid automatic repeat request acknowledgement (HARQ-ACK) feedback corresponding to the PDSCH transmission through a physical uplink control channel (PUCCH) or a physical uplink shared channel (PUSCH). The BS may determine to retransmit the PDSCH in some circumstances, for example, when a negative ACK (NACK) is received or a discontinuous transmission (DTX) occurs.

There is a need for handling HARQ retransmission for a multicast service in a wireless communication system.

SUMMARY

Some embodiments of the present disclosure provide a method for wireless communication performed by a user equipment (UE). The method may include: receiving, from a base station (BS), a first downlink control information (DCI) for scheduling a first transmission using a HARQ process number, wherein a cyclic redundancy check (CRC) of the first DCI is scrambled by a first radio network temporary identifier (RNTI); receiving, from the BS, a third DCI for scheduling a third transmission using the HARQ process number, wherein a CRC of the third DCI is scrambled by a third RNTI specific to the UE; and determining whether the third transmission is a retransmission of the first transmission or a retransmission of a second transmission scheduled by a second DCI, wherein the second DCI schedules the second transmission using the HARQ process number, a CRC of the second DCI is scrambled by a second RNTI common to a group of UEs including the UE.

Some embodiments of the present disclosure provide a method for wireless communication performed by a BS. The method may include: transmitting, to a group of UEs, a second DCI for scheduling a second transmission using a HARQ process number, wherein a CRC of the second DCI is scrambled by a second RNTI common to the group of UEs; and determining that the second transmission is incorrectly decoded by a UE of the group of UEs; and transmitting, to the UE, a third DCI for scheduling a third transmission using the HARQ process number, wherein a CRC of the third DCI is scrambled by a third RNTI specific to the UE, wherein the third transmission carries the same transport block (TB) as the second transmission.

Some embodiments of the present disclosure provide a UE. According to some embodiments of the present disclosure, the UE may include: a transceiver; and a processor coupled to the transceiver, wherein the transceiver and the processor may interact with each other so as to perform a method according to some embodiments of the present disclosure.

Some embodiments of the present disclosure provide a BS. According to some embodiments of the present disclosure, the BS may include: a transceiver; and a processor coupled to the transceiver, wherein the transceiver and the processor may interact with each other so as to perform a method according to some embodiments of the present disclosure.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced.

It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
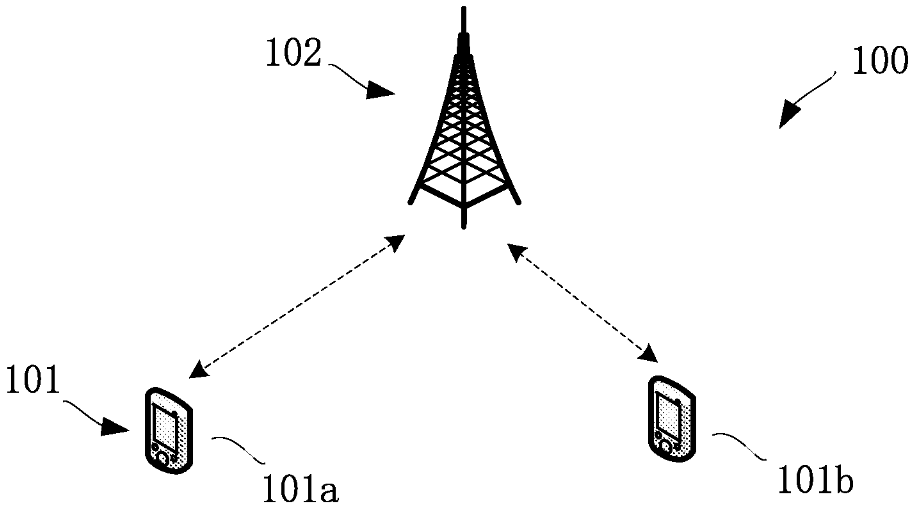
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101*a* and UE 101*b*) and a base station (e.g., BS 102). Although a specific number of UEs 101 and BS 102 are depicted in FIG. 1, it is contemplated that any number of UEs and BSs may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BSs 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with 5G NR of the 3GPP protocol. For example, BS 102 may transmit data using an orthogonal frequency division multiple (OFDM) modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

In some embodiments of the present disclosure, the wireless communication system 100 may support multicast and broadcast services (MBSs). For example, one or more UEs (e.g., UE 101*a* and UE 101*b*) may be grouped as an MBS group to receive MBSs (e.g., an MBS PDSCH) from a BS (e.g., BS 102). Several transmission schemes including, but not limited to, the following three transmission schemes may be applied for multicast transmission: a point-to-point (PTP) scheme, point-to-multipoint (PTM) scheme 1, and PTM scheme 2.

Under the PTP scheme, RRC_CONNECTED UEs may use a UE-specific PDCCH with a cyclic redundancy check (CRC) scrambled by a UE-specific radio network temporary identifier (RNTI) (e.g., cell-RNTI (C-RNTI)) to schedule a UE-specific PDSCH which is scrambled by the same UE-specific RNTI.

Under PTM scheme 1, RRC_CONNECTED UEs in the same MBS group may use a group-common PDCCH with a cyclic redundancy check (CRC) scrambled by a group-common radio network temporary identifier (RNTI) to schedule a group-common PDSCH which is scrambled by the same group-common RNTI. This scheme may also be referred to as a group-common PDCCH based group scheduling scheme. The group-common RNTI may be configured via RRC signaling.

Under PTM scheme 2, RRC_CONNECTED UEs in the same MBS group may use a UE-specific PDCCH with a CRC scrambled by a UE-specific RNTI (e.g., cell-RNTI) to schedule a group-common PDSCH which is scrambled by a group-common RNTI. This scheme may also be referred to as a UE-specific PDCCH based group scheduling scheme.

The "group-common PDCCH/PDSCH" may mean that the PDCCH or PDSCH is transmitted in a common time and/or frequency resources, and can be identified by all the UEs in the same MBS group. The "UE-specific PDCCH/PDSCH" may mean that the PDCCH or PDSCH can only be identified by the target UE, but cannot be identified by other UEs.

In some embodiments of the present disclosure, the same HARQ process ID (or HARQ process number) and new date indicator (NDI) may be used for PTM scheme 1 (re) transmissions and PTP retransmissions of the same transport block (TB). The maximum number of HARQ processes per cell, currently supported for unicast, may be kept unchanged for a UE to support multicast reception.

In some examples, for a TB to be transmitted via a multicast transmission, if PTM scheme 1 is used for an initial transmission of the TB and ACK/NACK based HARQ-ACK feedback is adopted, a PTP based retransmission, in which the cyclic redundancy check (CRC) of the DCI is scrambled by a UE-specific RNTI (e.g., C-RNTI), can be used for scheduling the retransmission of the TB, with the same HARQ process ID and an untoggled NDI. Since the NDI in a group-common (GC) PDCCH (GC-PDCCH) (e.g., GC-DCI) is indicated for the group of UEs, it usually cannot be toggled or untoggled for a specific UE within the group. With the assumption of an NDI toggled for a new transmission and untoggled for a retransmission, some error cases may occur when a GC-PDCCH is missed.

Figure 2:
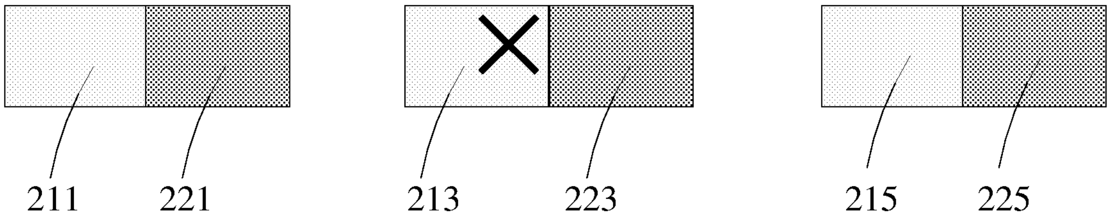
FIG. 2 illustrates a schematic diagram of a plurality of DCIs scheduling a plurality of DL transmissions in accordance with some embodiments of the present disclosure.

For example, an exemplary error case 1 as described below may occur. Referring to FIG. 2, in some embodiments, a BS may transmit, to a UE, DCI 211 with a CRC scrambled by a UE-specific RNTI (e.g., C-RNTI) to schedule the transmission of TB #1 on PDSCH 221. DCI 211 may indicate a HARQ process number (HPN) (e.g., HPN=X1) for PDSCH 221. The BS may transmit, to a group of UEs including the UE, DCI 213 with a CRC scrambled by a group-common RNTI (e.g., G-RNTI) to schedule an initial transmission of TB #2 on PDSCH 223. DCI 231 may indicate an HPN having the value of X1 for PDSCH 223. When DCI 213 is missed by the UE, the UE may report a NACK or a DTX to the BS. The BS may transmit DCI 215 with a CRC scrambled by a UE-specific RNTI (e.g., C-RNTI) to the UE to schedule the retransmission of TB #2 on PDSCH 225. DCI 215 may indicate an HPN having the value of X1 for PDSCH 225.

A misunderstanding on PDSCH 225 may occur. For example, the UE may misunderstand the retransmission of TB #2 as the retransmission of TB #1 in view of the same HPN and untoggled NDI (e.g., all of the NDI fields of DCIs 221-215 may indicate the value of "0"). For example, in the case that the UE has reported a NACK or a DTX to the BS for PDSCH 221, in response to the reception of PDSCH 225, the UE would regard PDSCH 225 as a retransmission of TB #1 due to the reported NACK or DTX from the UE. The UE may combine PDSCH 221 and PDSCH 225, which would result in the corruption of PDSCH 221 in the HARQ buffer. In the case that the UE has reported an ACK to the BS for PDSCH 221, in response to the reception of PDSCH 225, the UE would regard it as a retransmission of TB #1 due to an ACK to a NACK error at the BS side. The UE may report an ACK to the BS directly, without decoding PDSCH 225, which would result in a loss of TB #2.

For example, an exemplary error case 2 as described below may occur. Referring again to FIG. 2, in some embodiments, a UE may support a plurality of multicast services, and may be configured with a corresponding group-common RNTI (e.g., G-RNTI) for each of the plurality of multicast services. For instance, the UE may be configured with G-RNTI #1 for MBS service #1 and G-RNTI #2 for MBS service #2.

For a HARQ process X2, a BS may transmit, to a group of UEs including the UE, DCI 211 with a CRC scrambled by G-RNTI #1 to schedule the transmission of TB #1' on PDSCH 221, and DCI 213 with a CRC scrambled by G-RNTI #2 to schedule an initial transmission of TB #2' on a PDSCH 223. When DCI 213 is missed by the UE, the UE may report a NACK or a DTX to the BS. The BS may transmit DCI 215 with a CRC scrambled by a UE-specific RNTI (e.g., C-RNTI) to the UE to schedule the retransmission of TB #2' on PDSCH 225 using HARQ process X2.

A misunderstanding on PDSCH 225 may occur. For example, the UE may misunderstand the retransmission of TB #2' as the retransmission of TB #1' in view of the same HPN (e.g., HPN=X2) and untoggled NDI (e.g., all of the NDI fields of DCIs 221-215 may indicate the value of "0").

For example, in the case that the UE has reported a NACK or a DTX to the BS for PDSCH 221, in response to the reception of PDSCH 225, the UE would regard PDSCH 225 as a retransmission of TB #1' due to the reported NACK or DTX from the UE. The UE may combine PDSCH 221 and PDSCH 225, which would result in the corruption of PDSCH 221 in the HARQ buffer. In the case that the UE has reported an ACK to the BS for PDSCH 221, in response to the reception of PDSCH 225, the UE would regard it as a retransmission of TB #1' due to an ACK to a NACK error at the BS side or a NACK or a DTX report by other member UEs. The UE may report an ACK to the BS directly, without decoding PDSCH 225, which would result in a loss of TB #2'.

Embodiments of the present disclosure provide solutions to solve the above issues. More details on the embodiments of the present disclosure will be illustrated in the following text in combination with the appended drawings.

In some embodiments of the present disclosure, a UE may receive one or more multicast services and may be configured with a corresponding group-common RNTI for each multicast service. When a TB is transmitted on a group-common PDSCH, which is scheduled by a group-common DCI with a CRC scrambled by a group-common RNTI (e.g., G-RNTI x), in an initial transmission, the TB may be retransmitted in a PTP manner, for example, in a UE-specific PDSCH, which is scheduled by a UE-specific DCI with a CRC scrambled by a UE-specific RNTI. The UE-specific RNTI may be a combination of a UE-specific RNTI (e.g., C-RNTI) and the group-common RNTI (e.g., G-RNTI x).

In some examples, the combination of the UE-specific RNTI (e.g., C-RNTI) and the group-common RNTI (e.g., G-RNTI x) may refer to any operation of the two RNTIs, e.g., modular 2 addition operation of the two RNTIs. In some examples, the combination of the UE-specific RNTI and the group-common RNTI may refer to an XOR operation of the two RNTIs. Other methods for combining the two RNTIs that can be conceived of by persons skilled in the art can also be employed.

In this way, the combination of, for example, a C-RNTI and G-RNTI x may implicitly indicate that the PTP based retransmission of a TB is initially transmitted according to a PTM scheme.

Specifically, when a TB is initially transmitted according to a PTM scheme, the CRC of the scheduling DCI may be scrambled by a group-common RNTI (e.g., G-RNTI x) associated with the multicast service. When the TB is retransmitted according to the PTP scheme, the CRC of the scheduling DCI may be scrambled by a combination of the UE-specific RNTI (e.g., C-RNTI) and G-RNTI x. When a TB is initially transmitted according to the PTP scheme, the CRC of the scheduling DCI may be scrambled by the UE-specific RNTI (e.g., C-RNTI). When the TB is retransmitted according to the PTP scheme, the CRC of the scheduling DCI may still be scrambled by the C-RNTI.

At the UE side, when decoding a PDCCH, the UE may check the CRC with the C-RNTI, each G-RNTI (e.g., G-RNTI x) associated with a respective multicast service of the one or more multicast services supported at the UE, and the combination of the C-RNTI and each G-RNTI. In response to the reception of a DCI with a CRC scrambled by a combination of the C-RNTI and G-RNTI x, the UE would know that the scheduled transmission is a PTP retransmission of a multicast service associated with G-RNTI x.

Since different RNTIs are used for the PTP based retransmissions for a TB which is initially transmitted in a PTM scheme and a PTP scheme, and different RNTIs are used for different multicast services, a misunderstanding on the PTP retransmission for an initial PTM transmission and an initial PTP or unicast transmission can be avoided.

In some embodiments of the present disclosure, the PDSCH scheduled by a DCI with a CRC scrambled by a combination of, for example, the C-RNTI and G-RNTI x, may be scrambled by the C-RNTI. In some embodiments of the present disclosure, such PDSCH may be scrambled by the combination of the C-RNTI and G-RNTI x.

For example, referring again to FIG. 2, assuming that the BS transmits DCI 211 with the CRC scrambled by the C-RNTI to a UE, and DCI 213 with the CRC scrambled by G-RNTI #x1 associated with multicast service #x1 to a group of UEs including the UE, and the BS determines that PDSCH 223 is incorrectly decoded by the UE (which may be caused by various reasons, including for example, the UE misses DCI 213, or the UE receives DCI 213 but fails to correctly decode PDSCH 223), the BS may transmit DCI 215 with the CRC scrambled by a UE-specific RNTI, e.g., a combination of the C-RNTI of the UE and G-RNTI #x1, to retransmit the TB carried by PDSCH 223 on PDSCH 225.

For example, still referring to FIG. 2, assuming that the BS transmits DCI 211 with the CRC scrambled by G-RNTI #x2 associated with multicast service #x2 to a group of UEs including a UE, and DCI 213 with the CRC scrambled by G-RNTI #x3 associated with multicast service #x3 to a different or the same group of UEs including the UE, and the BS determines that PDSCH 223 is incorrectly decoded by the UE, the BS may transmit DCI 215 with the CRC scrambled by a UE-specific RNTI, e.g., a combination of the C-RNTI of the UE and G-RNTI #x3, to retransmit the TB carried by PDSCH 223 on PDSCH 225.

In some embodiments of the present disclosure, a UE may receive one or more multicast services and may be configured with a corresponding group-common RNTI for each multicast service. For each multicast service supporting PTP based retransmission, a UE-specific RNTI may be configured for scrambling the CRC of the DCI for scheduling the PTP based retransmission of a TB which is initially transmitted according to the PTM scheme. This UE-specific RNTI is configured to correspond to a multicast service. For example, for each of the one or more multicast services supported at the UE, a corresponding UE-specific RNTI may be configured. For instance, for multicast service #y received by the UE, the UE may be configured with a corresponding group-common RNTI (e.g., G-RNTI y) and a corresponding UE-specific RNTI (e.g., RNTI y) for the PTP transmission of the multicast service #y.

When a TB is transmitted on a group-common PDSCH, which is scheduled by a group-common DCI with a CRC scrambled by a group-common RNTI (e.g., G-RNTI y), in an initial transmission, the TB may be retransmitted in a PTP manner, for example, in a UE-specific PDSCH, which is scheduled by a UE-specific DCI with a CRC scrambled by a UE-specific RNTI (e.g., RNTI y) for the PTP retransmission of the multicast service associated with the group-common RNTI (e.g., G-RNTI y).

Specifically, when a TB is initially transmitted according to a PTM scheme, the CRC of the scheduling DCI may be scrambled by a group-common RNTI (e.g., G-RNTI y) associated with the multicast service. When the TB is retransmitted according to a PTP scheme, the CRC of the scheduling DCI may be scrambled by the UE-specific RNTI (e.g., RNTI y) for a PTP retransmission of an initial PTM transmission. When a TB is initially transmitted according to the PTP scheme, the CRC of the scheduling DCI may be scrambled by a UE-specific RNTI (e.g., C-RNTI). When the TB is retransmitted according to the PTP scheme, the CRC of the scheduling DCI may still be scrambled by the C-RNTI.

At the UE side, when decoding a PDCCH, the UE may check the CRC with the C-RNTI, each G-RNTI (e.g., G-RNTI y) associated with a respective multicast service of the one or more multicast services supported at the UE, and each UE-specific RNTI (e.g., RNTI y) for a PTP retransmission of an initial PTM transmission. In response to the reception of the DCI with a CRC scrambled by RNTI y, the UE would know that the scheduled transmission is a PTP retransmission of a multicast service associated with G-RNTI y.

Since different RNTIs are used for the PTP based retransmissions for a TB which is initially transmitted in a PTM scheme and a PTP scheme, and different RNTIs are used for different multicast services, a misunderstanding on the PTP retransmission for an initial PTM transmission and an initial PTP or unicast transmission can be avoided.

In some embodiments of the present disclosure, the PDSCH scheduled by a DCI with a CRC scrambled by a UE-specific RNTI (e.g., RNTI y) for a PTP retransmission of an initial PTM transmission may be scrambled by the C-RNTI. In some embodiments of the present disclosure, such PDSCH may be scrambled by RNTI y.

For example, referring again to FIG. 2, assuming that the BS transmits DCI 211 with the CRC scrambled by the C-RNTI to a UE, and DCI 213 with the CRC scrambled by G-RNTI #y1 associated with multicast service #y1 to a group of UEs including the UE, and the BS determines that PDSCH 223 is incorrectly decoded by the UE, the BS may transmit DCI 215 with the CRC scrambled by a UE-specific RNTI (e.g., RNTI #y1) for the PTP transmission of the multicast service associated with G-RNTI #y1 to retransmit the TB carried by PDSCH 223 on PDSCH 225.

For example, still referring to FIG. 2, assuming that the BS transmits DCI 211 with the CRC scrambled by G-RNTI #y2 associated with multicast service #y2 to a group of UEs including a UE, and DCI 213 with the CRC scrambled by G-RNTI #y3 associated with multicast service #y3 to a different or the same group of UEs including the UE, and the BS determines that PDSCH 223 is incorrectly decoded by the UE, the BS may transmit DCI 215 with the CRC scrambled by a UE-specific RNTI (e.g., RNTI #y3) for the PTP transmission of multicast service #y3 to retransmit the TB carried by PDSCH 223 on PDSCH 225.

In some embodiments of the present disclosure, a UE may receive one or more multicast services and may be configured with corresponding group-common RNTI for each multicast service. For each of the services, The UE may be configured with a corresponding ID for scrambling the CRC of the DCI scheduling a retransmission of the corresponding service. For instance, for multicast service #z received by the UE, the UE may be configured with a corresponding group-common RNTI (e.g., G-RNTI z) and a corresponding service ID (e.g., ID z).

When a TB is transmitted on a group-common PDSCH, which is scheduled by a group-common DCI with a CRC scrambled by a group-common RNTI (e.g., G-RNTI z), in an initial transmission, the TB may be retransmitted in a PTP manner, for example, in a UE-specific PDSCH, which is scheduled by a UE-specific DCI with a CRC scrambled by a UE-specific RNTI. The UE-specific RNTI may be a combination of a UE-specific RNTI (e.g., C-RNTI) and the service ID (e.g., ID z) of the multicast service associated with the group-common RNTI (e.g., G-RNTI z).

In some examples, the combination of the UE-specific RNTI (e.g., C-RNTI) and the service ID (e.g., ID z) may refer to any operation between the UE-specific RNTI and the service ID, e.g., modular 2 addition operation of the C-RNTI and ID z. In some examples, the combination of the UE-specific RNTI (e.g., C-RNTI) and the service ID (e.g., ID z) may refer to an XOR operation of the C-RNTI and ID z. Other methods for combining the C-RNTI and ID z that can be conceived of by persons skilled in the art can also be employed.

Specifically, when a TB is initially transmitted according to a PTM scheme, the CRC of the scheduling DCI may be scrambled by a group-common RNTI (e.g., G-RNTI z) associated with the multicast service. When the TB is retransmitted according to the PTP scheme, the CRC of the scheduling DCI may be scrambled by a combination of the UE-specific RNTI (e.g., C-RNTI) and the service ID (e.g., ID z) of the multicast service (e.g., multicast service z) associated with the group-common RNTI (e.g., G-RNTI z).

When a TB is initially transmitted according to a PTP scheme, the CRC of the scheduling DCI may be scrambled by the UE-specific RNTI (e.g., C-RNTI). When the TB is retransmitted according to the PTP scheme, the CRC of the scheduling DCI may still be scrambled by the C-RNTI. This can be deemed as the value of the service ID of the unicast service having a value of 0.

At the UE side, when decoding a PDCCH, the UE may check the CRC with the C-RNTI, each G-RNTI (e.g., G-RNTI z) associated with a respective multicast service of the one or more multicast services supported at the UE, and the combination of the C-RNTI and each service ID. In response to the reception of a DCI with a CRC scrambled by a combination of the C-RNTI and ID z, the UE would know that the scheduled transmission is a PTP retransmission of multicast service z associated with G-RNTI z.

Since different RNTIs are used for the PTP based retransmissions for a TB which is initially transmitted in a PTM scheme and a PTP scheme, and different RNTIs are used for different multicast services, a misunderstanding on the PTP retransmission for an initial PTM transmission and an initial PTP or unicast transmission can be avoided.

In some embodiments of the present disclosure, the PDSCH scheduled by a DCI with a CRC scrambled by a combination of, for example, the C-RNTI and ID z, may be scrambled by the C-RNTI. In some embodiments of the present disclosure, such PDSCH may be scrambled by the combination of the C-RNTI and ID z.

For example, referring again to FIG. 2, assuming that the BS transmits DCI 211 with the CRC scrambled by the C-RNTI to a UE, and DCI 213 with the CRC scrambled by G-RNTI #z1 associated with multicast service #z1 to a group of UEs including the UE, and the BS determines that PDSCH 223 is incorrectly decoded by the UE, the BS may transmit DCI 215 with the CRC scrambled by a UE-specific RNTI, e.g., a combination of the C-RNTI of the UE and service ID #z1 for multicast service #z1 associated with G-RNTI #z1, to retransmit the TB carried by PDSCH 223 on PDSCH 225.

For example, still referring to FIG. 2, assuming that the BS transmits DCI 211 with the CRC scrambled by G-RNTI #z2 associated with multicast service #z2 to a group of UEs including a UE, and DCI 213 with the CRC scrambled by G-RNTI #z3 associated with multicast service #z3 to a different or the same group of UEs including the UE, and the BS determines that PDSCH 223 is incorrectly decoded by the UE, the BS may transmit DCI 215 with the CRC scrambled by a UE-specific RNTI, e.g., a combination of the C-RNTI of the UE and service ID #z3 for multicast service #z3 associated with G-RNTI #z3, to retransmit the TB carried by PDSCH 223 on PDSCH 225.

In some embodiments of the present disclosure, a service index may be configured specifically for each service for differentiating different multicast services and the unicast service.

For example, a service indicator (SI) may be included in the UE-specific DCI with a CRC scrambled by the UE-specific RNTI (e.g., C-RNTI) to indicate the corresponding service index. The SI may not be included in the group-common DCI with a CRC scrambled by the group-common RNTI (e.g., G-RNTI). The number of bits for indicating the SI in the UE-specific DCI may be determined based on the number of multicast services supported by a UE (denoted as "N"). For example, the number of bits for indicating an SI may equal to $\lceil \log_2(N+1) \rceil$.

For instance, assuming that the UE is receiving 3 multicast services, 2 bits may be needed in the UE-specific DCI for indicating the SI. In some examples, the service index of a unicast service may be set to 0, and the value of the SI being "00" may be used to indicate the PDSCH scheduled by the DCI for the (re)transmission of a unicast service. The service index for multicast service #1 may be set to 1, and the value of the SI being "01" may be used to indicate the PDSCH scheduled by the DCI for retransmission of multicast service #1 which is initially transmitted according to a PTM scheme.

Specifically, when a TB is initially transmitted according to a PTM scheme, the CRC of the scheduling DCI may be scrambled by a group-common RNTI (e.g., G-RNTI n) associated with the multicast service. When the TB is retransmitted according to a PTP scheme, the CRC of the scheduling DCI may be scrambled by the UE-specific RNTI (e.g., C-RNTI). The scheduling DCI may indicate the service index of the multicast service (e.g., multicast service n) associated with the group-common RNTI (e.g., G-RNTI n).

When a TB is initially transmitted according to a PTP scheme, the CRC of the scheduling DCI is scrambled by the UE-specific RNTI (e.g., C-RNTI). The SI of the scheduling DCI may indicate the service index of the unicast service. When the TB is retransmitted according to the PTP scheme, the CRC of the scheduling DCI is still scrambled by the C-RNTI, and the SI of the scheduling DCI may still indicate the service index of the unicast service.

At the UE side, when decoding a PDCCH, the UE may check the SI included in the UE-specific DCI. In response to the reception of a DCI with an SI indicating the service index of a multicast service (e.g., multicast service n), the UE would know that the scheduled transmission is for the PTP retransmission of multicast service n.

Since different service indices are indicated for the PTP based retransmissions for a TB which is initially transmitted in a PTM scheme and a PTP scheme, a misunderstanding on the PTP retransmission for an initial PTM transmission and an initial PTP or unicast transmission can be avoided.

For example, referring again to FIG. 2, assuming that the BS transmits DCI 211 with the CRC scrambled by the C-RNTI to a UE, and DCI 213 with the CRC scrambled by G-RNTI #n1 associated with multicast service #n1 to a group of UEs including the UE, and the BS determines that PDSCH 223 is incorrectly decoded by the UE, the BS may transmit DCI 215 with the CRC scrambled by the C-RNTI to retransmit the TB carried by PDSCH 223 on PDSCH 225. DCI 211 may include a service index field indicating the unicast service (e.g., SI="00"), and DCI 215 may include a service index field indicating the multicast service #n1 (e.g., SI="01"). In this way, the UE would know that PDSCH 225 is a retransmission of PDSCH 223. Otherwise, if the service index field of DCI 215 indicates the unicast service (e.g., SI="00"), the UE may determine that PDSCH 225 is a retransmission of PDSCH 221.

For example, still referring to FIG. 2, assuming that the BS transmits DCI 211 with the CRC scrambled by G-RNTI #n2 associated with multicast service #n2 to a group of UEs including a UE, and DCI 213 with the CRC scrambled by G-RNTI #n3 associated with multicast service #n3 to a different or the same group of UEs including the UE, and the BS determines that PDSCH 223 is incorrectly decoded by the UE, the BS may transmit DCI 215 with the CRC scrambled by the C-RNTI to retransmit the TB carried by PDSCH 223 on PDSCH 225. DCI 215 may include a service index field indicating the multicast service #n3 (e.g., SI="11"). In this way, the UE would know that PDSCH 225 is a retransmission of PDSCH 223. Otherwise, if the service index field of DCI 215 indicates the multicast service #n2 (e.g., SI="10"), the UE may determine that PDSCH 225 is a retransmission of PDSCH 221.

Figure 3:
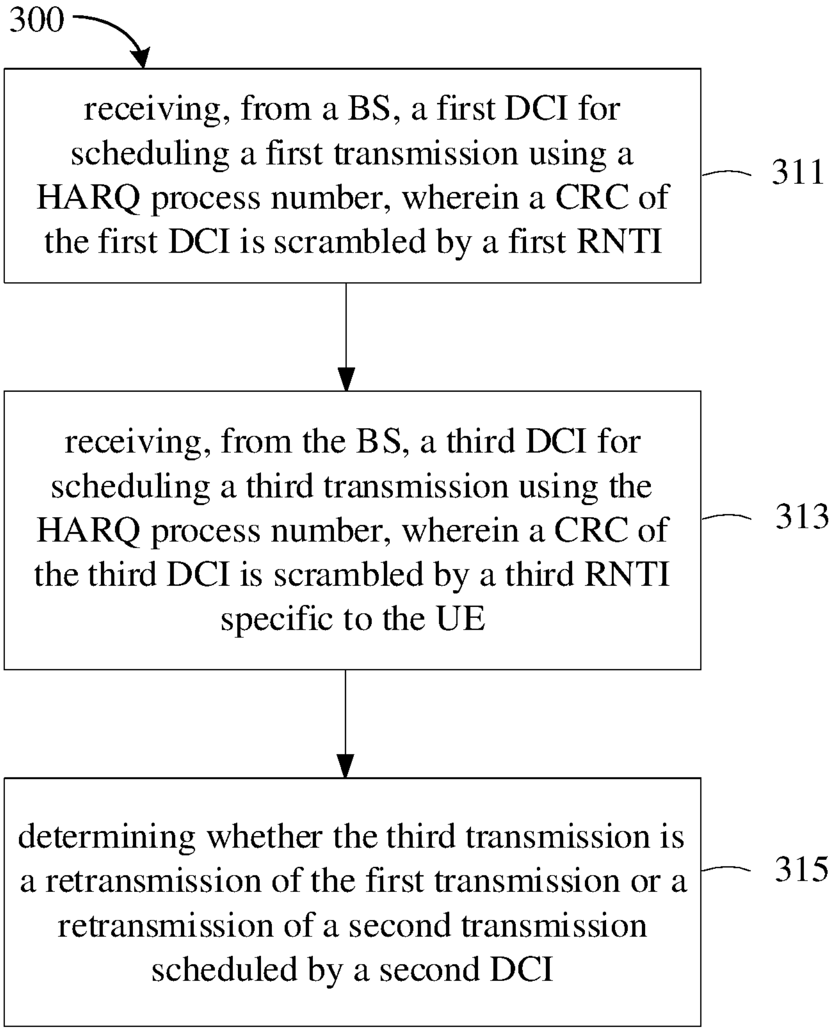
FIG. 3 illustrates a flow chart of an exemplary procedure of wireless communications in accordance with some embodiments of the present disclosure.

FIG. 3 illustrates a flow chart of an exemplary procedure 300 for wireless communications in accordance with some embodiments of the present disclosure. Details described in all of the foregoing embodiments of the present disclosure are applicable for the embodiments shown in FIG. 3. In some examples, the procedure may be performed by a UE, for example, UE 101 in FIG. 1.

Referring to FIG. 3, in operation 311, a UE may receive, from a BS, a first DCI (e.g., DCI 211 in FIG. 2) for scheduling a first transmission (e.g., PDSCH 221 in FIG. 2) using a HARQ process number, wherein a CRC of the first DCI may be scrambled by a first RNTI. The first RNTI may be specific to the UE (e.g., a C-RNTI) or common to the group of UEs including the UE (e.g., a G-RNTI).

In operation 313, the UE may receive, from the BS, a third DCI (e.g., DCI 215 in FIG. 2) for scheduling a third transmission (e.g., PDSCH 225 in FIG. 2) using the HARQ process number, wherein a CRC of the third DCI may be scrambled by a third RNTI specific to the UE.

In operation 315, the UE may determine whether the third transmission is a retransmission of the first transmission or a retransmission of a second transmission (e.g., PDSCH 223 in FIG. 2) scheduled by a second DCI (e.g., DCI 213 in FIG. 2). The second DCI may schedule the second transmission using the HARQ process number. The CRC of the second DCI may be scrambled by a second RNTI common to a group of UEs including the UE.

In some embodiments, in response to determining that the third transmission is the retransmission of the second transmission and the second transmission is missed, the UE may decode the third transmission. In some embodiments, in response to determining that the third transmission is the retransmission of the second transmission and the second transmission is received but not correctly decoded, the UE may combine the second transmission and the third transmission for decoding. For example, the UE may perform a soft combination of the second transmission and the third transmission to decode the corresponding TB. In some embodiments, in response to determining that the third transmission is the retransmission of the second transmission and the second transmission is received and correctly decoded, the UE may skip the decoding of the third transmission.

In some embodiments, in response to determining that the third transmission is the retransmission of the first transmission and the first transmission is not correctly decoded, the UE may combine the first transmission and the third transmission for decoding. For example, the UE may perform a soft combination of the first transmission and the third transmission to decode the corresponding TB. In some embodiments, in response to determining that the third transmission is the retransmission of the first transmission and the first transmission is correctly decoded, the UE may skip the decoding of the third transmission.

The UE may be configured with a corresponding group-common RNTI (G-RNTI) for each multicast service received by the UE. In some embodiments of the present disclosure, the UE may check the CRC of the third DCI with the UE-specific RNTI (e.g., C-RNTI), each group-common RNTI associated with a respective multicast service, and the combination of the UE-specific RNTI and each group-common RNTI. For example, the UE may check whether the third RNTI is a C-RNTI, a G-RNTI associated with a multicast service, or a combination of the C-RNTI and the G-RNTI. The combination of the two RNTIs may be a modular 2 addition operation or an XOR operation of the two RNTIs. Other methods for combining the two RNTIs that can be conceived of by persons skilled in the art can also be employed.

In some embodiments, the first RNTI is the UE-specific RNTI (e.g., C-RNTI). In response to the third RNTI being the same as the first RNTI, the UE may determine that the third transmission is the retransmission of the first transmission. In response to the third RNTI being a combination of the first RNTI and the second RNTI, the UE may determine that the third transmission is the retransmission of the second transmission. When the third transmission is the retransmission of the second transmission, the third transmission may be scrambled by the first RNTI or the third RNTI.

In some embodiments, the first RNTI is a group-common RNTI (e.g., G-RNTI). In response to the third RNTI being a combination of a UE-specific RNTI (e.g., C-RNTI) and the first RNTI, the UE may determine that the third transmission is the retransmission of the first transmission. In response to the third RNTI being a combination of the UE-specific RNTI (e.g., C-RNTI) and the second RNTI, the UE may determine that the third transmission is the retransmission of the second transmission. When the third transmission is the retransmission of the second transmission, the third transmission may be scrambled by the UE-specific RNTI (e.g., C-RNTI) or the third RNTI.

In some embodiments of the present disclosure, for each multicast service supporting PTP based retransmission, the UE may be configured with a UE-specific RNTI (e.g., RNTI y) for the PTP retransmission of an initial PTM transmission. The UE may check the CRC of the third DCI with UE-specific RNTI (e.g., C-RNTI), each group-common RNTI associated with a respective multicast service, and each UE-specific RNTI (e.g., RNTI y) for the PTP retransmission of an initial PTM transmission.

In some embodiments, the first RNTI is the UE-specific RNTI (e.g., C-RNTI). In response to the third RNTI being the same as the first RNTI, the UE may determine that the third transmission is the retransmission of the first transmission. In response to the third RNTI being an RNTI configured for the PTP transmission of a multicast service associated with the second RNTI, the UE may determine that the third transmission is the retransmission of the second transmission. When the third transmission is the retransmission of the second transmission, the third transmission may be scrambled by the first RNTI or the third RNTI.

In some embodiments, the first RNTI is a group-common RNTI (e.g., G-RNTI). In response to the third RNTI being an RNTI configured for the PTP transmission of a multicast service associated with the first RNTI, the UE may determine that the third transmission is the retransmission of the first transmission. In response to the third RNTI being an RNTI configured for the PTP transmission of a multicast service associated with the second RNTI, the UE may determine that the third transmission is the retransmission of the second transmission. When the third transmission is the retransmission of the second transmission, the third transmission may be scrambled by the UE-specific RNTI (e.g., C-RNTI) or the third RNTI.

In some embodiments of the present disclosure, for each of the multicast services received by the UE, the UE may be configured with a corresponding ID (e.g., ID z) for scrambling the CRC of the DCI scheduling retransmission of the corresponding service. The UE may check the CRC of the third DCI with the UE-specific RNTI (e.g., C-RNTI), each group-common RNTI associated with a respective multicast service, and the combination of the UE-specific RNTI and each service ID. For example, the UE may check whether the third RNTI is a C-RNTI, a G-RNTI associated with a multicast service, or a combination of the C-RNTI and the service ID of the multicast service. The combination of the RNTI and service ID may be a modular 2 addition operation or an XOR operation of the RNTI and service ID. Other methods for the combination operation that can be conceived of by persons skilled in the art can also be employed.

In some embodiments, the first RNTI is the UE-specific RNTI (e.g., C-RNTI). In response to the third RNTI being the same as the first RNTI, the UE may determine that the third transmission is the retransmission of the first transmission. In response to the third RNTI being a combination of the first RNTI and the service ID for the multicast service associated with the second RNTI, the UE may determine that the third transmission is the retransmission of the second transmission. When the third transmission is the retransmission of the second transmission, the third transmission may be scrambled by the first RNTI or the third RNTI.

In some embodiments, the first RNTI is a group-common RNTI (e.g., G-RNTI). In response to the third RNTI being a combination of a UE-specific RNTI (e.g., C-RNTI) and a service ID for the multicast service associated with the first RNTI, the UE may determine that the third transmission is the retransmission of the first transmission. In response to the third RNTI being a combination of a UE-specific RNTI (e.g., C-RNTI) and a service ID for the multicast service associated with the second RNTI, the UE may determine that the third transmission is the retransmission of the second transmission. When the third transmission is the retransmission of the second transmission, the third transmission may be scrambled by the UE-specific RNTI (e.g., C-RNTI) or the third RNTI.

In some embodiments of the present disclosure, a UE-specific DCI may include a service index field indicating the SI as described above. A group-common DCI may not include such field. The size of the service index field may be determined based on the number of multicast services supported by the UE. A group-common DCI may not include a service index field.

In some embodiments, the first RNTI is the UE-specific RNTI (e.g., C-RNTI). In response to a value of a service index field of the third DCI being the same as that of the first DCI, the UE may determine that the third transmission is the retransmission of the first transmission. In response to the value of the service index field of the third DCI being different from that of the first DCI, the UE may determine that the third transmission is the retransmission of the second transmission. The second DCI may not include a service index field.

In some embodiments, the first RNTI is a group-common RNTI (e.g., G-RNTI). In response to the service index field of the third DCI indicating a multicast service associated with the first RNTI, the UE may determine that the third transmission is the retransmission of the first transmission. In response to the service index field of the third DCI indicating a multicast service associated with the second RNTI, the UE may determine that the third transmission is the retransmission of the second transmission. The first DCI and the second DCI may not include a service index field.

It should be appreciated by persons skilled in the art that the sequence of the operations in exemplary procedure 300 may be changed and some of the operations in exemplary procedure 300 may be eliminated or modified, without departing from the spirit and scope of the disclosure.

Figure 4:
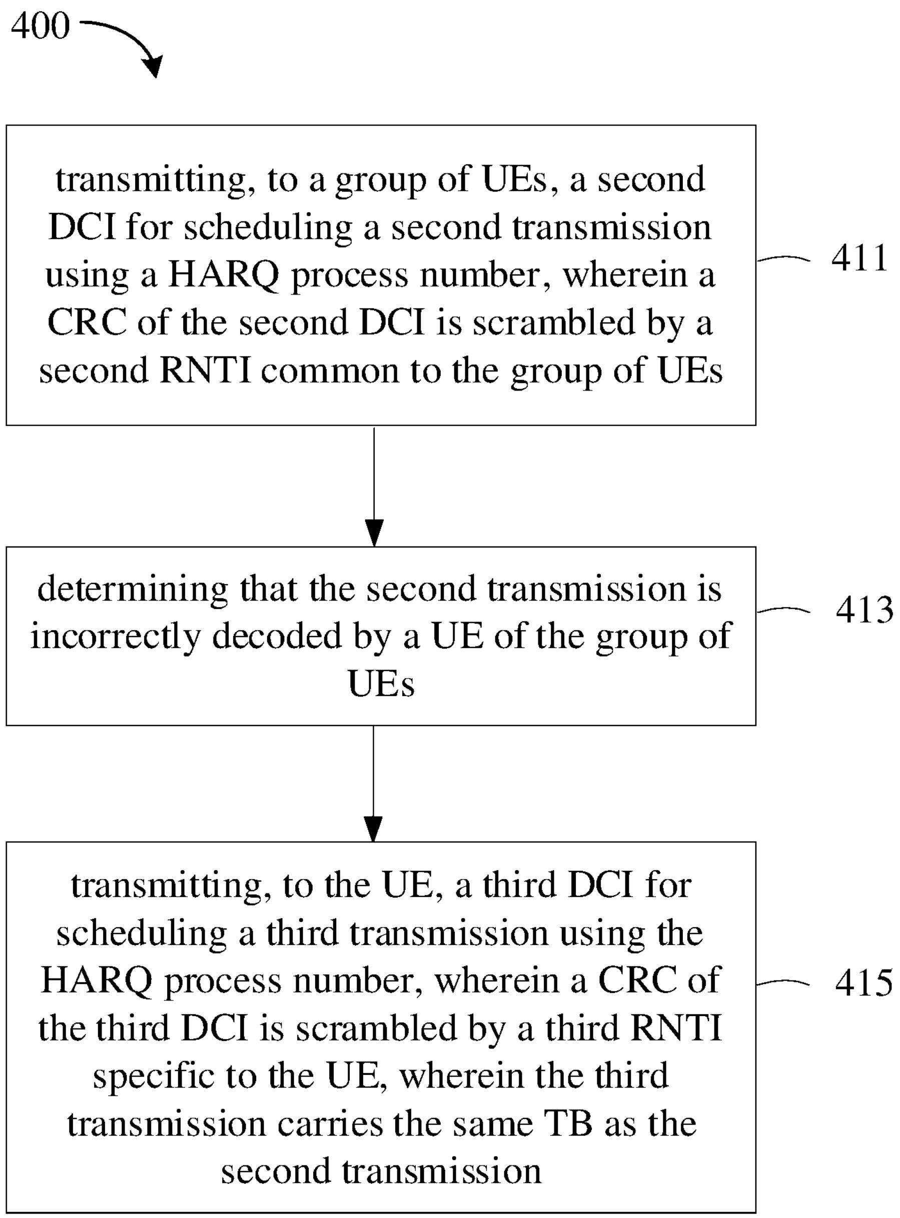
FIG. 4 illustrates a flow chart of an exemplary procedure of wireless communications in accordance with some embodiments of the present disclosure.

FIG. 4 illustrates a flow chart of an exemplary procedure 400 for wireless communications in accordance with some embodiments of the present disclosure. Details described in all of the foregoing embodiments of the present disclosure are applicable for the embodiments shown in FIG. 4. In some examples, the procedure may be performed by a BS, for example, BS 102 in FIG. 1.

Referring to FIG. 4, in operation 411, a BS may transmit, to a group of UEs, a second DCI for scheduling a second transmission using a HARQ process number, wherein a CRC of the second DCI is scrambled by a second RNTI common to the group of UEs.

In operation 413, the BS may determine that the second transmission is incorrectly decoded by a UE of the group of UEs. In operation 415, BS may transmit, to the UE, a third DCI for scheduling a third transmission using the HARQ process number, wherein a CRC of the third DCI is scrambled by a third RNTI specific to the UE, wherein the third transmission carries the same TB as the second transmission.

In some embodiments of the present disclosure, the third RNTI may be a combination of the UE-specific RNTI (e.g., C-RNTI) of the UE and the second RNTI. The combination of the two RNTIs may be a modular 2 addition operation or an XOR operation of the two RNTIs. Other methods for combining the two RNTIs that can be conceived of by persons skilled in the art can also be employed.

In some embodiments of the present disclosure, the UE may be configured with a UE-specific RNTI (e.g., RNTI y) for the PTP retransmission of the multicast service associated with the second RNTI. The third RNTI may be such RNTI (e.g., RNTI y).

In some embodiments of the present disclosure, the UE may be configured with a service ID for the multicast service associated with the second RNTI. The third RNTI may be a combination of UE-specific RNTI (e.g., C-RNTI) of the UE and the service ID. The combination of the RNTI and the service ID may be a modular 2 addition operation or an XOR operation of the RNTI and the service ID. Other combination methods that can be conceived of by persons skilled in the art can also be employed.

In some embodiments of the present disclosure, the BS may scramble the third transmission with the UE-specific RNTI (e.g., C-RNTI) of the UE or the third RNTI.

In some embodiments of the present disclosure, a UE-specific DCI may include a service index field. For example, the third DCI may include a service index field indicating a multicast service associated with the second RNTI. The size of the service index field of the third DCI may be determined based on the number of multicast services supported by the UE. A group-common DCI may not include such service index field. For example, the second DCI does not include a service index field.

It should be appreciated by persons skilled in the art that the sequence of the operations in exemplary procedure 400 may be changed and some of the operations in exemplary procedure 400 may be eliminated or modified, without departing from the spirit and scope of the disclosure.

Figure 5:
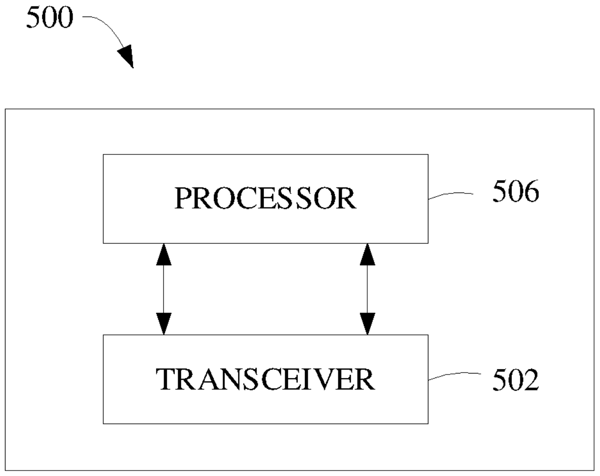
FIG. 5 illustrates a block diagram of an exemplary apparatus in accordance with some embodiments of the present disclosure.

FIG. 5 illustrates a block diagram of an exemplary apparatus 500 according to some embodiments of the present disclosure.

As shown in FIG. 5, the apparatus 500 may include at least one processor 506 and at least one transceiver 502 coupled to the processor 506. The apparatus 500 may be a UE or a BS.

Although in this figure, elements such as the at least one transceiver 502 and processor 506 are described in the singular, the plural is contemplated unless a limitation to the singular is explicitly stated. In some embodiments of the present application, the transceiver 502 may be divided into two devices, such as a receiving circuitry and a transmitting circuitry. In some embodiments of the present application, the apparatus 500 may further include an input device, a memory, and/or other components.

In some embodiments of the present application, the apparatus 500 may be a UE. The transceiver 502 and the processor 506 may interact with each other so as to perform the operations with respect to the UE described in FIGS. 1-4. In some embodiments of the present application, the apparatus 500 may be a BS. The transceiver 502 and the processor 506 may interact with each other so as to perform the operations with respect to the BS described in FIGS. 1-4.

In some embodiments of the present application, the apparatus 500 may further include at least one non-transitory computer-readable medium.

For example, in some embodiments of the present disclosure, the non-transitory computer-readable medium may have stored thereon computer-executable instructions to cause the processor 506 to implement the method with respect to the UE as described above. For example, the computer-executable instructions, when executed, cause the processor 506 interacting with transceiver 502, so as to perform the operations with respect to the UE described in FIGS. 1-4.

In some embodiments of the present disclosure, the non-transitory computer-readable medium may have stored thereon computer-executable instructions to cause the processor 506 to implement the method with respect to the BS as described above. For example, the computer-executable instructions, when executed, cause the processor 506 interacting with transceiver 502 to perform the operations with respect to the BS described in FIGS. 1-4.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A, B, or both A and B. The wording "the first," "the second" or the like is only used to clearly illustrate the embodiments of the present application, but is not used to limit the substance of the present application.

What is claimed:

1. A method performed by a user equipment (UE), the method comprising:

receiving, from a base station (BS), a first downlink control information (DCI) for scheduling a first transmission using a hybrid automatic repeat request (HARQ) process number, a cyclic redundancy check (CRC) of the first DCI being scrambled by a first radio network temporary identifier (RNTI);

receiving, from the BS, a third DCI for scheduling a third transmission using the HARQ process number, a CRC of the third DCI being scrambled by a third RNTI specific to the UE; and determining whether the third transmission is a retransmission of the first transmission or a retransmission of a second transmission scheduled by a second DCI, the second DCI scheduling the second transmission using the HARQ process number, a CRC of the second DCI scrambled by a second RNTI being common to a group of UEs including the UE.

2. The method of claim 1, further comprising at least one of:

in response to determining that the third transmission is the retransmission of the second transmission and the second transmission is missed, decoding the third transmission;

in response to determining that the third transmission is the retransmission of the second transmission and the second transmission is received while not correctly decoded, combining the second transmission and the third transmission for decoding;

in response to determining that the third transmission is the retransmission of the second transmission and the second transmission is received and correctly decoded, skipping decoding the third transmission;

in response to determining that the third transmission is the retransmission of the first transmission and the first transmission is not correctly decoded, combining the first transmission and the third transmission for decoding; and in response to determining that the third transmission is the retransmission of the first transmission and the first transmission is correctly decoded, skipping decoding the third transmission.

3. The method of claim 1, wherein the first RNTI is specific to the UE or common to the group of UEs including the UE.

4. A user equipment (UE) for wireless communication, comprising:

at least one memory; and at least one processor coupled with the at least one memory and configured to cause the UE to:

receive, from a base station (BS), a first downlink control information (DCI) for scheduling a first transmission using a hybrid automatic repeat request (HARQ) process number, a cyclic redundancy check (CRC) of the first DCI being scrambled by a first radio network temporary identifier (RNTI);

receive, from the BS, a third DCI for scheduling a third transmission using the HARQ process number, a CRC of the third DCI being scrambled by a third RNTI specific to the UE; and determine whether the third transmission is a retransmission of the first transmission or a retransmission of a second transmission scheduled by a second DCI, the second DCI scheduling the second transmission using the HARQ process number, a CRC of the second DCI scrambled by a second RNTI being common to a group of UEs including the UE.

5. The UE of claim 4, wherein the at least one processor is configured to cause the UE to at least one of:

in response to determining that the third transmission is the retransmission of the second transmission and the second transmission is missed, decode the third transmission;

in response to determining that the third transmission is the retransmission of the second transmission and the second transmission is received while not correctly decoded, combine the second transmission and the third transmission for decoding;

in response to determining that the third transmission is the retransmission of the second transmission and the second transmission is received and correctly decoded, skip decoding the third transmission;

in response to determining that the third transmission is the retransmission of the first transmission and the first transmission is not correctly decoded, combine the first transmission and the third transmission for decoding; and in response to determining that the third transmission is the retransmission of the first transmission and the first transmission is correctly decoded, skip decoding the third transmission.

6. The UE of claim 4, wherein the first RNTI is specific to the UE or common to the group of UEs including the UE.

7. The UE of claim 4, wherein to determine whether the third transmission is the retransmission of the first transmission or the retransmission of the second transmission, the at least one processor is configured to cause the UE to:

determine that the third transmission is the retransmission of the first transmission in response to the third RNTI being equivalent to the first RNTI; and determine that the third transmission is the retransmission of the second transmission in response to:

the third RNTI being a combination of the first RNTI and the second RNTI;

the third RNTI being an RNTI configured for a point-to-point (PTP) transmission of a multicast service associated with the second RNTI; or the third RNTI being a combination of the first RNTI and a service ID, wherein the service ID is configured for a multicast service associated with the second RNTI.

8. The UE of claim 7, wherein in response to determining that the third transmission is the retransmission of the second transmission, the third transmission is scrambled by the first RNTI or the third RNTI.

9. The UE of claim 4, wherein to determine whether the third transmission is the retransmission of the first transmission or the retransmission of the second transmission, the at least one processor is configured to cause the UE to:

determine that the third transmission is the retransmission of the first transmission in response to a value of a service index field of the third DCI being equivalent to that of the first DCI; and determine that the third transmission is the retransmission of the second transmission in response to the value of the service index field of the third DCI being different from that of the first DCI.

10. The UE of claim 9, wherein a size of the service index fields of the first DCI and the third DCI is determined based on a number of multicast services supported by the UE.

11. The UE of claim 9, wherein the second DCI does not include a service index field.

12. The UE of claim 4, wherein to determine whether the third transmission is the retransmission of the first transmission or the retransmission of the second transmission, the at least one processor is configured to cause the UE to:

determine that the third transmission is the retransmission of the first transmission in response to the third RNTI being a combination of a fourth RNTI specific to the UE and the first RNTI; and determine that the third transmission is the retransmission of the second transmission in response to the third RNTI being a combination of the fourth RNTI and the second RNTI.

13. The UE of claim 4, wherein to determine whether the third transmission is the retransmission of the first transmission or the retransmission of the second transmission, the at least one processor is configured to cause the UE to:

determine that the third transmission is the retransmission of the first transmission in response to the third RNTI being an RNTI configured for a point-to-point (PTP) transmission of a multicast service associated with the first RNTI; and determine that the third transmission is the retransmission of the second transmission in response to the third RNTI being an RNTI configured for a PTP transmission of a multicast service associated with the second RNTI.

14. The UE of claim 4, wherein to determine whether the third transmission is the retransmission of the first transmission or the retransmission of the second transmission, the at least one processor is configured to cause the UE to:

determine that the third transmission is the retransmission of the first transmission in response to the third RNTI being a combination of a fourth RNTI specific to the UE and a first service ID, wherein the first service ID is configured for a multicast service associated with the first RNTI; and determine that the third transmission is the retransmission of the second transmission in response to the third RNTI being a combination of the fourth RNTI and a second service ID, wherein the second service ID is configured for a multicast service associated with the second RNTI.

15. The UE of claim 14, wherein the third transmission is scrambled by the fourth RNTI or the third RNTI.

16. The UE of claim 4, wherein to determine whether the third transmission is the retransmission of the first transmission or the retransmission of the second transmission, the at least one processor is configured to cause the UE to:

determine that the third transmission is the retransmission of the first transmission in response to a service index field of the third DCI indicating a multicast service associated with the first RNTI; and determine that the third transmission is the retransmission of the second transmission in response to the service index field of the third DCI indicating a multicast service associated with the second RNTI.

17. The UE of claim 16, wherein a size of the service index field of the third DCI is based on a number of multicast services supported by the UE.

18. The UE of claim 16, wherein the first DCI and the second DCI do not include a service index field.

19. A method performed by a base station, the method comprising:

transmitting, to a user equipment (UE), a first downlink control information (DCI) for scheduling a first transmission using a hybrid automatic repeat request (HARQ) process number, a cyclic redundancy check (CRC) of the first DCI being scrambled by a first radio network temporary identifier (RNTI);

transmitting, to a group of UEs including the UE, a second DCI for scheduling a second transmission using the HARQ process number, the CRC of the second DCI being scrambled by a second RNTI common to the group of UEs;

determining that the second transmission is incorrectly decoded by the UE;

transmitting, to the UE, a third DCI for scheduling a third transmission using the HARQ process number, a CRC of the third DCI being scrambled by a third RNTI specific to the UE, the third transmission carrying a same transport block (TB) as the first transmission or the second transmission; and transmitting, to the UE, an indication of whether the third transmission is a retransmission of the first transmission or a retransmission of the second transmission.

20. A base station for wireless communication, comprising:

at least one memory; and at least one processor coupled with the at least one memory and configured to cause the base station to:

transmit, to a user equipment (UE), a first downlink control information (DCI) for scheduling a first transmission using a hybrid automatic repeat request (HARQ) process number, a cyclic redundancy check (CRC) of the first DCI being scrambled by a first radio network temporary identifier (RNTI);

transmit, to a group of UEs including the UE, a second DCI for scheduling a second transmission using the HARQ process number, the CRC of the second DCI being scrambled by a second RNTI common to the group of UEs;

determine that the second transmission is incorrectly decoded by the UE;

transmit, to the UE, a third DCI for scheduling a third transmission using the HARQ process number, a CRC of the third DCI being scrambled by a third RNTI specific to the UE, the third transmission carrying a same transport block (TB) as the first transmission or the second transmission; and transmit, to the UE, an indication of whether the third transmission is a retransmission of the first transmission or a retransmission of the second transmission.

* * * * *